(No Model.)

H. R. BORIE.
PIPE COUPLING.

No. 320,907. Patented June 30, 1885.

WITNESSES:
John Dollerson
F. Norman Dixon.

H. R. Borie
INVENTOR
By his Attorneys,
W. C. Strawbridge
J. Bonsall Taylor

UNITED STATES PATENT OFFICE.

HIRAM R. BORIE, OF PHILADELPHIA, PENNSYLVANIA, ASSIGNOR OF ONE-HALF TO STEPHEN P. M. TASKER, OF SAME PLACE.

PIPE-COUPLING.

SPECIFICATION forming part of Letters Patent No. 320,907, dated June 30, 1885.

Application filed March 19, 1885. (No model.)

*To all whom it may concern:*

Be it known that I, HIRAM R. BORIE, a citizen of the United States, residing in the city and county of Philadelphia, in the State of Pennsylvania, have invented an Improvement in Pipe-Couplings, of which the following is a specification.

The object of my improvement is the provision of simple and effectual means for coupling together the meeting extremities of what are known as "thin-metal" tubes, or tubes the metal of which is too thin to be commercially cut with screw-threads, and in the coupling of which it is desirable that the meeting ends of the tubes should be brought butts together.

A good form of a preferred embodiment of my coupling is represented in the accompanying drawings and described in this specification, the particular subject-matter claimed as novel being hereinafter definitely specified.

Figure 1:
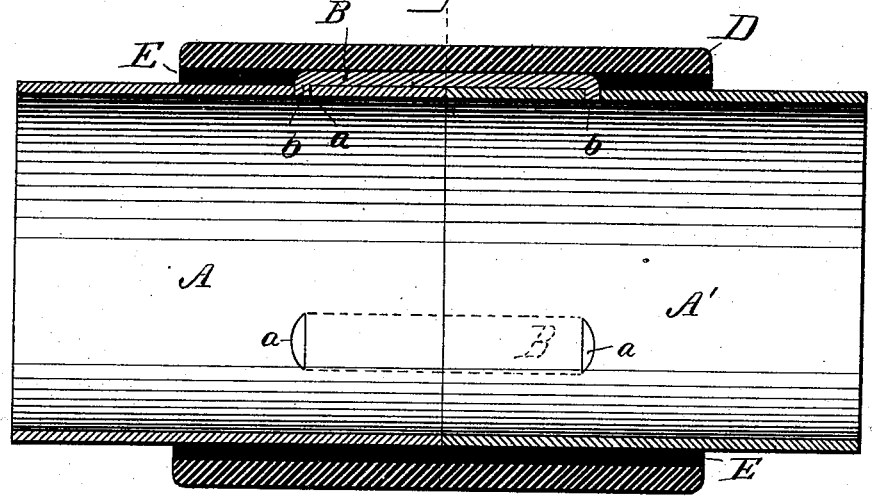
Figure 2:
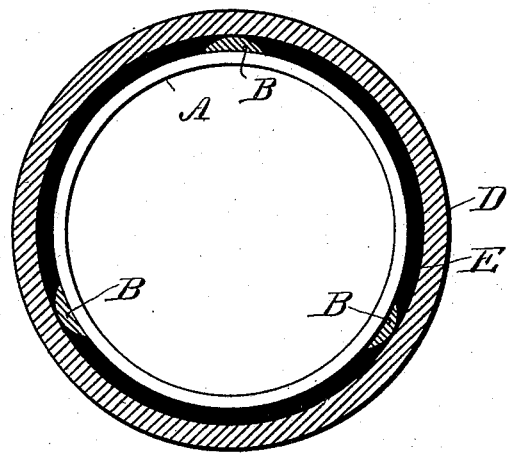
Figure 3:
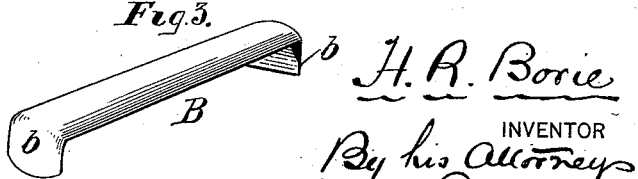

In the drawings, Figure 1 is a longitudinal vertical central sectional elevation through a coupling embodying my improvement. Fig. 2 is an end view of the same. Fig. 3 is a perspective view of the hook.

Similar letters of reference indicate corresponding parts.

In the drawings, A A' represent the meeting extremities of two tubes to be coupled. These extremities, as will be observed, are brought butts together.

B are double hooks, of any preferred shape, the turned-down or hooked extremities $b$ of which are adapted to enter suitably-shaped holes, $a$, cut through the substance of the pipes at proper positions thereon to receive the said hooked extremities.

D is a circumscribing collar, adapted to be slipped over the hooks after their hooked extremities have been introduced into the holes, and which is of sufficient interior diameter to fit snugly around the pipes when the hooks have been applied thereto.

E is a packing of lead or other suitable substance, which is introduced within the cylindric interspace existing between the interior surfaces of the collar and the exterior surfaces of the extremities of the tubes.

In the drawings I have represented three hooks as being employed. One or two hooks would, however, be sufficient; or a series of more than three might, if desired, be employed. The hooks are either round, flat, square, half-round, or, in fact, of any desired shape, the half-round shape represented in the drawings being a convenient one. The holes are preferably conformed to the hooked ends of the hooks.

As the holes serve simply to retain the hooked ends of the hooks, it is obvious that they need not be formed completely through the metal of the tubes, but that indentations or other suitable depressions or retaining-seats for the said extremities would answer the purpose.

In the setting up of the coupling, after the ends of the tubes have been brought together, the hooks are applied, and while temporarily held in place the collar is slipped over them, and when the latter is in suitable position packing is interposed.

Having thus described my invention, I claim—

The combination, to form a pipe-coupling, of two sections of pipe, each provided with holes, indentations, or depressions, one or more double hooks, the hooked extremities of which are adapted to take into said holes, indentations, or depressions, a collar circumscribing the hooks in place upon the tubes, and packing introduced between the collar and the tubes, substantially as set forth.

In testimony whereof I have hereunto signed my name this 9th day of March, A. D. 1885.

HIRAM R. BORIE.

In presence of—
WM. C. STRAWBRIDGE,
J. BONSALL TAYLOR.